United States Patent [19]

Kuramoto

[11] Patent Number: 4,747,063
[45] Date of Patent: May 24, 1988

[54] METHOD OF DETERMINING AN OPTIMUM SET VALUE FOR A SIDE TRIMMING MACHINE

[75] Inventor: Satoru Kuramoto, Hyogo, Japan

[73] Assignee: Mitsubishi Denki Kabushiki Kaisha, Tokyo, Japan

[21] Appl. No.: 860,298

[22] Filed: May 6, 1986

[30] Foreign Application Priority Data

May 7, 1985 [JP] Japan .................................. 60-95631

[51] Int. Cl.$^4$ ........................ G01B 11/02; B64D 15/00
[52] U.S. Cl. .................................... 364/563; 364/472; 364/475; 72/16; 72/9; 72/203
[58] Field of Search ..................... 364/472, 563, 476; 72/16, 12, 9, 203

[56] References Cited

U.S. PATENT DOCUMENTS

| | | | |
|---|---|---|---|
| 2,931,917 | 4/1960 | Beelitz | 72/16 X |
| 4,196,648 | 4/1980 | Jones et al. | 83/365 |
| 4,248,072 | 2/1981 | Hasegawa et al. | 364/472 X |
| 4,281,696 | 8/1981 | Howard et al. | 83/56 X |
| 4,346,575 | 8/1982 | Shibahara et al. | 72/16 |
| 4,386,511 | 6/1983 | Morita | 72/16 X |
| 4,415,976 | 11/1983 | Cook | 72/16 X |
| 4,497,192 | 2/1985 | Reizig et al. | 72/13 X |
| 4,578,983 | 4/1986 | Kimura | 72/14 X |
| 4,587,823 | 5/1986 | Eibe | 72/240 X |

Primary Examiner—Jerry Smith
Assistant Examiner—Steve L. Hoang
Attorney, Agent, or Firm—Bernard, Rothwell & Brown

[57] ABSTRACT

In a method of trimming a width of an elongate sheet stock by a side trimmer, respective minimum widths of both side portions, i.e. a work side portion and a drive side portion, of the stock are measured in advance, and then respective trimming allowance values of the two side portions are determined on the basis of the thus measured minimum widths thereof, respectively. According to this method, the elongate stock can be kept free from insufficiency of the trimming allowance during the trimming operation. Thus the present method makes it possible to determine an optimum set value for the side trimmer to trim the elongate stock in consideration of the actual width of the stock and a desired final width of a finished stock or product.

2 Claims, 5 Drawing Sheets

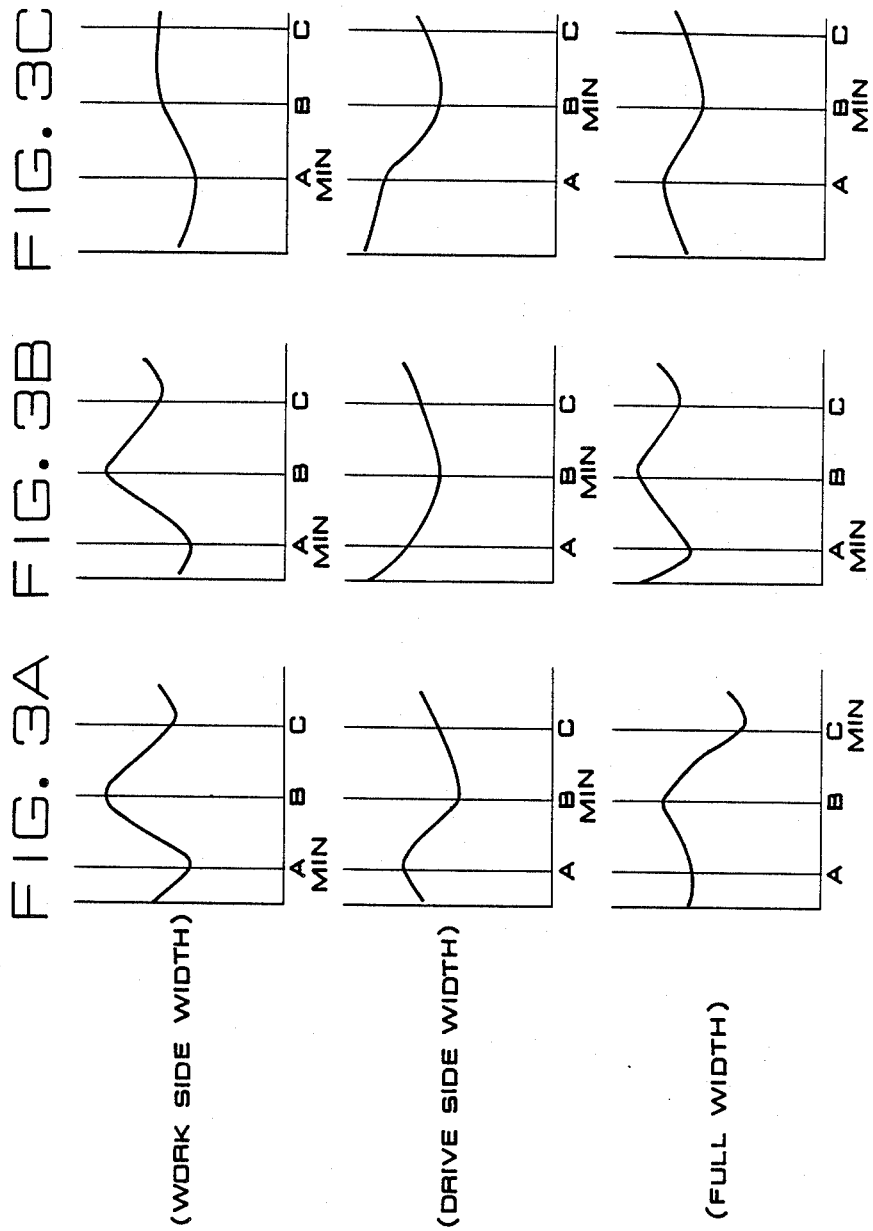

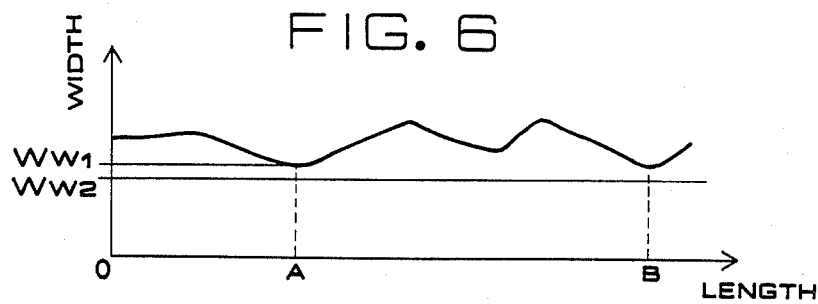
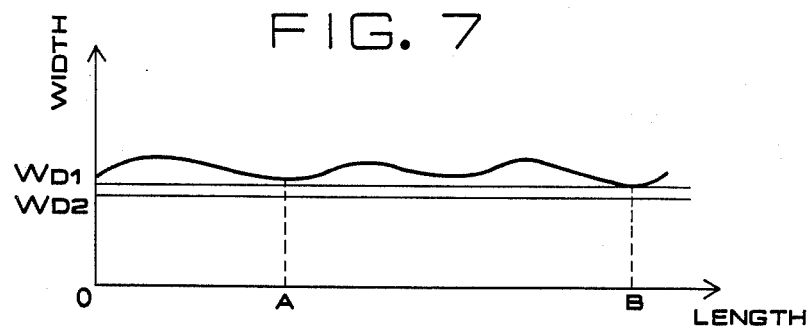
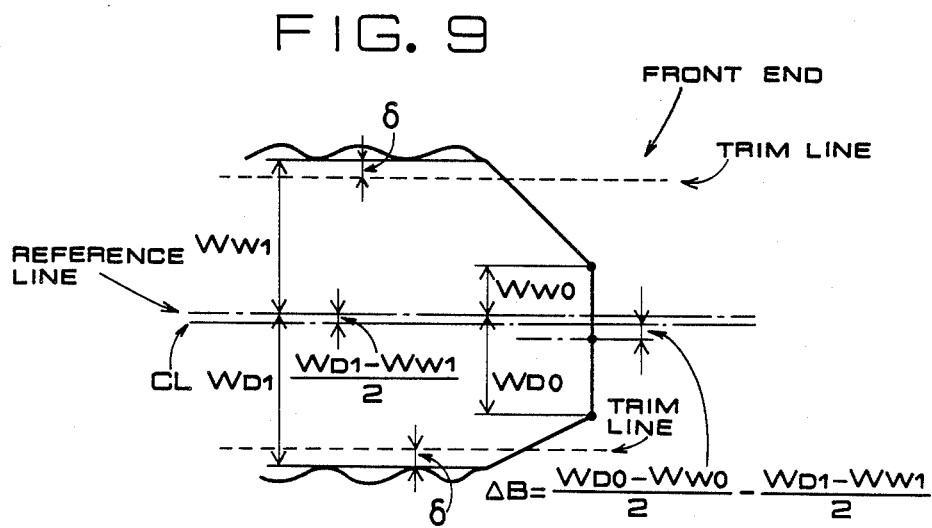

METHOD OF DETERMINING AN OPTIMUM SET VALUE FOR A SIDE TRIMMING MACHINE

BACKGROUND OF THE INVENTION

1. Field of the Invention

The present invention relates to a method of determining a set value for a side trimming machine to trim a width of an elongate workpiece such as an uncoiled hoop or a steel strip.

2. Description of the Prior Art

It has been customary to determine a set value for such a side trimmer on the basis of two different data, i.e. an actual width of the hoop produced in a rolling mill upstream of the side trimmer and a final width which a finally trimmed hoop or product will have. For this purpose there are provided a measuring unit for measuring the hoop produced in the rolling mill to obtain an actual width thereof and a recorder unit for recording the values thus obtained, these two units being disposed upstream of the side trimmer. The hoop is continuously measured in width as it advances from its leading end to its trailing end and then the values thus measured are recorded as in a chart, an example of which is shown in FIG. 1 of the accompanying drawings (as described later on).

Then a final set width W2 of the product or finished hoop is determined on the basis of the data of the width thus obtained, including an actual minimum width W1 of the hoop. In obtaining the final set width W2, a total trimming allowance value, i.e. the difference between the minimum width W1 of the untrimmed hoop and the final set width W2 of the trimmed hoop, which is represented by W1−W2, is determined. The minimum width W1 thus obtained, however, is based on an edge-to-edge measurement data, but not on an edge-to-center measurement data including minimum widths of adjacent side portions disposed at both sides of a reference line on the hoop. Thus in such prior practice, the total trimming allowance value is usually set to be large enough to avoid a mistrimming due to insufficiency of the allowance.

With the set values thus determined, the side trimmer cuts off opposite side edge portions of the hoop by a value equal to a half of the total trimming allowance, i.e. ½(W1−W2). The hoop is customarily coiled upstream of the side trimming station because of necessity of transportation between the rolling mill and the side trimmer which are not linearly continuously connected to each other. Subsequently, the hoop in coil form must be uncoiled to be trimmed at the opposite side edges in the side trimmer.

According to the conventional practice, a set value for the side trimmer is determined on the basis of the total trimming allowance equal to difference between the actual width of the hoop and the final width thereof as shown in FIG. 2, in which respective trimming allowance values of the opposite side stock portions of the hoop, i.e. a work side portion and a drive side portion are artificially considered as equal. However, if dimensional variations in the respective widths of the work side and drive side portions are very large, either of a pair of trim lines or final edge lines of the product can fail to be located within the work side portion or the drive side portion due to the insufficiency of the trimming allowance, thus causing a mistrimming. To increase the total trimming allowance for prevention of such mistrimming is disadvantageous in view of consumption of the material.

SUMMARY OF THE INVENTION

It is therefore an object of the present invention to provide a method of determining an optimum set value for a side trimming machine to trim an elongate sheet stock, e.g. a hoop, so as to overcome the above-described drawbacks in the conventional method.

Another object of the invention is to provide a method of determining an optimum trimming allowance of the hoop on the basis of a relation between an actual width measured thereon prior to trimming and a final set width which a finished hoop or product will have.

Many other objects and advantages of the invention will become manifest to those versed in the art upon making reference to the detailed description and accompanying drawings.

BRIEF DESCRIPTION OF THE DRAWINGS

FIGS. 3A, 3B and 3C are exemplary charts of Examples 1, 2 and 3, respectively, showing the expected patterns of widths measured continuously on the hoop as it advances;

FIG. 6 is a chart showing a work side width of the hoop measured continuously as the hoop advances;

FIG. 7 is a chart showing a drive side width of the hoop measured continuously as the hoop advances;

FIG. 9 is a fragmentary plan view of the hoop showing a manner in which the hoop is displaced sidewardly by a value ΔB as the hoop is uncoiled.

DETAILED DESCRIPTION OF THE PREFERRED EMBODIMENTS

With reference to the accompanying drawings, a method of determining an optimum set value for side trimming according to a preferred embodiment of the present invention is described hereinbelow:

In consideration of expected patterns of a full width of the hoop, three cases, i.e. Examples 1, 2 and 3 are considered, as shown in FIGS. 3A, 3B and 3C, respectively. In each of Examples 1, 2 and 3, respective minimum widths of the work side portion and the drive side portion are located at points A and B, respectively. Thus the full widths become minimum respectively at (1) point C (which is neither point A nor point B),
(2) point A, and
(3) point B.

Figure 4:
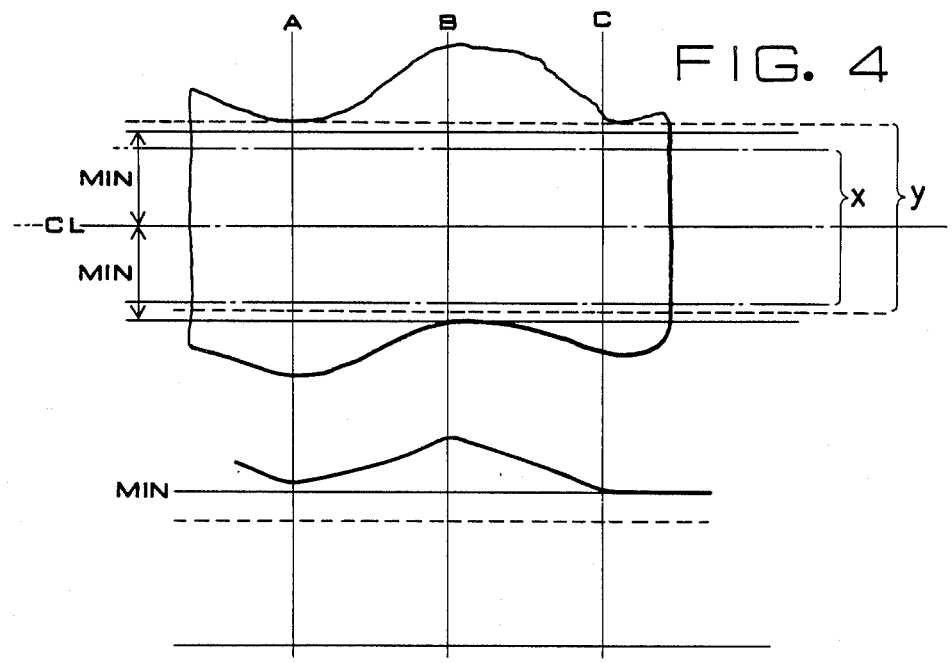
FIG. 4 is a plan view of the hoop corresponding to Example 1 of FIG. 3A.

FIG. 4 is a fragmentary plan view of the hoop corresponding to Example 1. In this case, if the final width is set at value y on the basis of the minimum value of the full width at point C, the hoop remains untrimmed at point A since an actual edge of the hoop at point A is located out of a trimming allowance zone defined by and between an edge line of the hoop and a trim line set upon value y. Accordingly, the final width must be deliberately set at value x which is smaller than value y as shown in FIG. 4. In other words, the total trimming allowance value must be increased by value y-x in consideration of an actual minimum width expected to exist at an unknown point (e.g. at point A in this case). Consequently, it has been customary to determine the final width of the hoop product upon value x which is smaller than value y on the basis of the measured minimum full width and is considered to be small enough to provide a suitable trimming allowance value. This practice is performed also in case of Examples 2 and 3, with result that the thus obtained trimming allowance is apt to be objectionably larger than that determined on the basis of the minimum widths of the work side and drive side portions measured at points A and B, respectively commonly.

Figure 1:
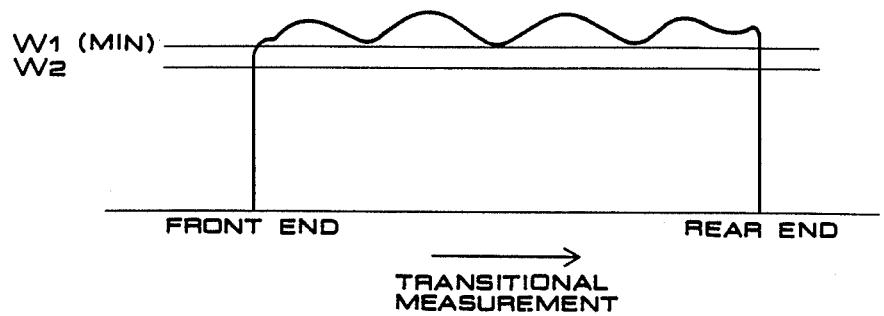
FIG. 1 is a chart used in a method of determining an optimum set value for a conventional side trimmer, showing a full width of a hoop stock continuously measured from its front end to its rear end as it advances.
Figure 2:
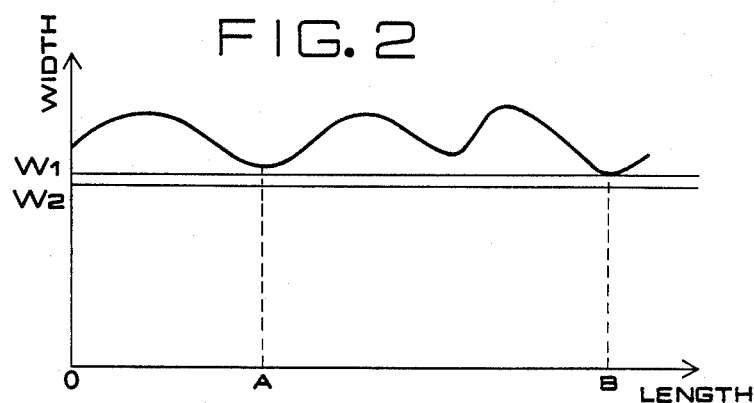
FIG. 2 is a chart showing a full width of the hoop stock including a workside width and a drive side width measured continuously on the hoop as it advances.
Figure 5:
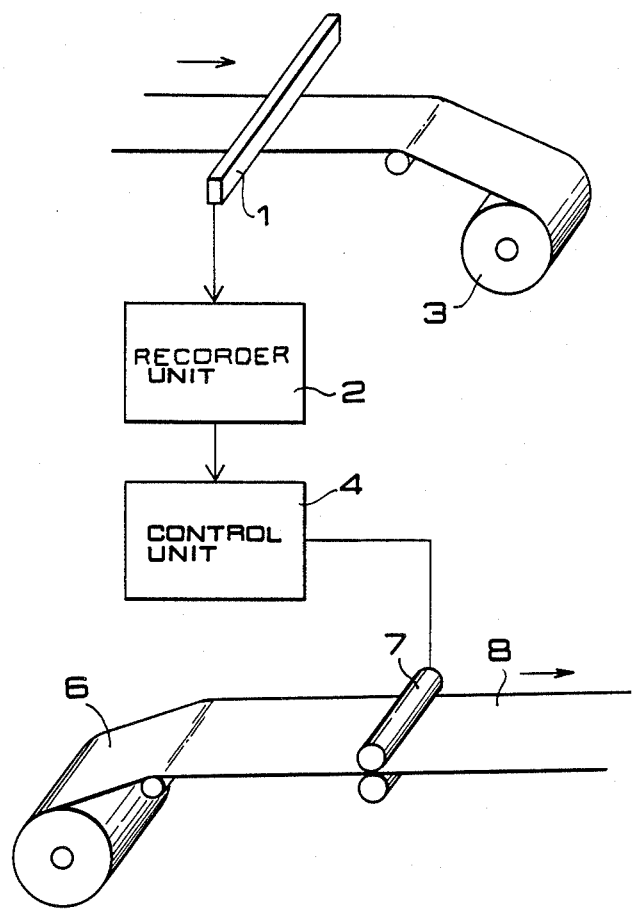
FIG. 5 is a schematical view of a system used in a method of determining an optimum set value for a side trimming machine according to an embodiment of the invention.

In FIG. 5, reference numeral 1 designates a measuring unit for measuring various widths concerning the hoop produced in an upstream station, numeral 2 a recorder unit for recording the measurement data obtained at the measuring unit 1, numeral 3 a coiler for winding the produced hoop stock, numeral 4 a control unit for determining an optimum set value for trimming the width of the hoop and issuing a command signal to a side trimming machine 7, numeral 6 indicates an uncoiling roll and numeral 8 indicates the trimmed strip. FIG. 6 illustrates a work side width of the hoop measured continuously as the hoop advances in a production line, in which Ww1 indicates a minimum work side width, and Ww2 indicates a set work side width determined in consideration of a trimming allowance. FIG. 7 similarly illustrates a drive side width of the hoop measured in a similar manner, in which Wd1 indicates a minimum drive side width, and Wd2 indicates a set drive side width determined in consideration of a trimming allowance. FIG. 2 illustrates a full width of the hoop given by the total of the work side width and drive side width of FIGS. 6 and 7, respectively. The set width or final width W2 has been conventionally determined on such full width.

The control unit 4 according to the present invention determines, on the basis of the respective width values of the work side and drive side portions recorded in the recorder unit 2, a work side trimming allowance given by Ww1−Ww2, and a drive side trimming allowance given by Wd1−Wd2, and hence a full width of a final hoop product given by Ww2+Wd2. Upon the thus determined set values, the control unit 4 issues a command signal to the side trimmer 7, which in turn cuts the hoop at its opposite side edge portions in accordance with the optimum set width.

In the above-described case, if the respective minimum widths of the work side portion and the drive side portion are located at points A and B, respectively, as shown in FIGS. 6 and 7, the minimum value W1 of the full width of the hoop is expected to be located at either of points A and B. The control unit 4 finds or reads the respective minimum widths of the work side and drive side portions out of the measurement data concerning the respective widths of the two side portions memorized by the recorder unit 2, and then calculates from the values thus read-out a final width for each of the two portions in consideration of their trimming allowance values. In this way the control unit 4 determines the respective set values for trimming Ww1, Wd1; Ww2, Wd2 upon which cutter blades of the side trimmer 7 are positioned accordingly for trimming the opposite edge portions of the work side and the drive side.

Figure 8:
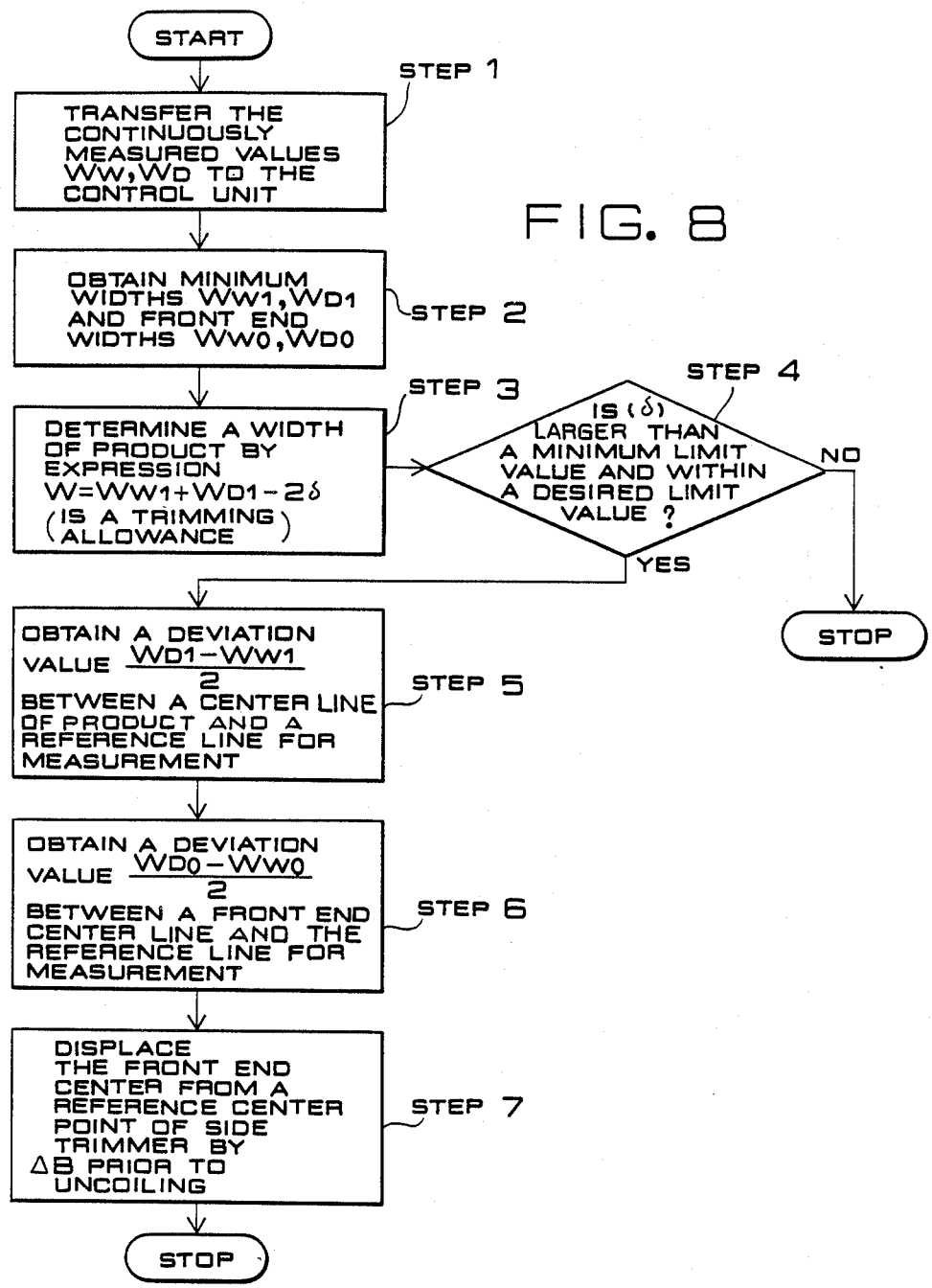
FIG. 8 is a flow chart showing the method according to the invention.

With reference to FIGS. 8 and 9, a sequence of operation of the side trimming system according to the present invention is described hereinbelow:

The control unit 4 operates to determine respective suitable positions of the cutter blades of the side trimmer in the manner described below.

In a roll-press operation line, a freshly produced hoop is continuously measured in respective widths of the work side and drive side portions as the hoop advances, thus obtained data of widths being recorded by the recorder unit 2. In step 1, the measured values Ww, Wd concerning the hoop of a certain length having a front end and a rear end are transferred from the recorder unit 2 to the control unit 4. Then the control unit 4 reads the data Ww, Wd to obtain the minimum widths Ww1, Wd1, and front end widths Ww0, Wd0 of the work side and drive side portions, respectively, in step 2. In step 3, a final full width W of a finally trimmed product of the hoop is determined by an expression $$W = Ww1 + Wd1 - 2\delta$$

wherein $\delta$ represents a trimming allowance commonly applied to the work side portion and the drive side portion and is larger than 0.

In step 4, it is determined whether $\delta$ is larger than a predetermined minimum limit value or not and whether $\delta$ is within a predetermined limit value. If $\delta$ is within the limit value, a deviation value of a center line of the hoop product from a reference line for measuring the width thereof, which is represented by $(Wd1 - Ww1)/2$ is determined in step 5.

In step 6, a deviation value between the reference and a front end center which is represented by $(Wd0 - Ww0)/2$ is determined on the basis of the deviation value obtained in the step 5. The front end center is used as a reference point when the hoop in coil is uncoiled. Finally, in step 7, the front end center of the coiled hoop is set in a position in alignment with a point which is deviated from a reference center mark of the side trimmer by value $\Delta B$ represented by an expression $$\Delta B = (Wd0 - Ww0)/2 - (Wd1 - Ww1)/2$$

Under this condition, the hoop starts to be uncoiled.

According to the present invention, the hoop is measured in width at the work side and drive side portions individually at a point disposed upstream of a side trimming station, and then the measurement values thus obtained are analyzed to determine respective minimum widths of the work side and drive side portions. Finally, an optimum set value for the side trimmer to trim the hoop is determined on the basis of the minimum widths of the two side portions thus obtained. Since the respective minimum widths are known, a trimming allowance at each side portion can be set to be larger than a predetermined value. Thus the present invention provides a system for analyzing a dimensional relation between an actual width of the hoop produced in an upstream station and a final set width which the trimmed hoop or product will have so that it is possible to determine an optimum and precise set value for the side trimmer to perform a trimming.

What is claimed is:

1. A method of determining an optimum set value for a side trimming machine to trim an elongate sheet stock such as a hoop of steel, comprising the steps of
    (a) measuring continuously respective widths of both side portions of a work side portion and a drive side portion, of the elongate stock as the stock advances, the two side portions extending in a laterally adjacent relation and being divided by a reference line on the stock;
    (b) analyzing said respective widths of the work side and drive side portions obtained in said measuring step for finding out respective minimum values of said widths; and
    (c) determining on the basis of said respective minimum values respective set positions of the side cutter blades of the side trimming machine which trim the work side portion and the drive side portion, respectively.

2. A method according to claim 1, said step of determining said set positions of the cutter blades including the steps of
    (a) determining a final width which a trimmed finished elongate sheet stock will deliberately have;
    (b) determining whether respective trimming allowance values of said work side and drive side portions are larger than a predetermined minimum limit value and smaller than a predetermined maximum value;
    (c) obtaining a deviation value by which a center line of said final width is displaced from said reference line dividing said elongate stock into said work side and said drive side portions;
    (d) obtaining a deviation value by which a center line of a front end width of the elongate stock is displaced from said reference line before the elongate sheet stock coiled in an upstream operation line is uncoiled for its trimming operation; and
    (e) obtaining an adjustment value by which said center line of the front end width of the elongate stock is set to be displaced from a reference center point of the side trimming machine so that the elongate stock can be uncoiled at a suitable position.

* * * * *